(12) United States Patent
Chen et al.

(10) Patent No.: US 7,768,807 B2
(45) Date of Patent: Aug. 3, 2010

(54) BIDIRECTIONAL NO LOAD CONTROL WITH OVERSHOOT PROTECTION

(75) Inventors: Keming Chen, Torrance, CA (US); Steven E. Schulz, Torrance, CA (US)

(73) Assignee: GM Global Technology Operations, Inc., Detroit, MI (US)

( * ) Notice: Subject to any disclaimer, the term of this patent is extended or adjusted under 35 U.S.C. 154(b) by 287 days.

(21) Appl. No.: 11/748,106

(22) Filed: May 14, 2007

(65) Prior Publication Data

US 2008/0284387 A1 Nov. 20, 2008

(51) Int. Cl.
*H02M 7/217* (2006.01)
(52) U.S. Cl. .......................... 363/127; 363/89
(58) Field of Classification Search ............. 363/15–17, 363/21.06, 21.14, 65, 84, 89, 97, 125, 127, 363/131
See application file for complete search history.

(56) References Cited

U.S. PATENT DOCUMENTS 6,856,521 B1 * 2/2005 Chen et al. .................... 363/17
6,937,483 B2 * 8/2005 Zhu et al. ...................... 363/17
7,116,012 B2 * 10/2006 Kajouke et al. ................ 307/64
2005/0024894 A1 * 2/2005 Liu et al. ....................... 363/15

FOREIGN PATENT DOCUMENTS

DE 102204039691 A1 3/2005

* cited by examiner

*Primary Examiner*—Adolf Berhane
*Assistant Examiner*—Matthew Grubb
(74) *Attorney, Agent, or Firm*—Ingrassia Fisher & Lorenz, P.C.

(57) ABSTRACT

A method of operating an isolated bi-directional dc/dc converter to provide voltage regulation at a no-load condition over a wide voltage range and also provide overshoot protection for the boost mode main switching transistors uses new boost mode drive waveforms. The new waveforms drive switches S2 and S4 to be turned off during boost mode and only S1 and S3 are switched to provide reverse energy flow at no-load. In boost mode, C1 and C2 provide overshoot protection caused by leakage inductance of the isolation transformer when boost mode drive transistors turn off during forward energy flow and provide stored energy for reverse energy flow during reverse energy flow periods used for voltage regulation in the boost mode. In buck mode, C1 and C2 provide soft switching for buck mode main switching transistors S2 and S4.

14 Claims, 4 Drawing Sheets

Prior Art Waveform

BIDIRECTIONAL NO LOAD CONTROL WITH OVERSHOOT PROTECTION

BACKGROUND OF THE INVENTION

1. Field of the Invention

The present invention relates to switching power conversion circuits, including but not limited to, bi-directional power conversion circuits.

2. Description of Related Art

Bi-directional, isolated DC-to-DC inverters are useful in a wide range of applications. Examples of such applications include, but are not limited to, uninterruptible power supplies, battery charging systems, auxiliary power supplies for hybrid electrical vehicles and pure electric vehicles.

FIG. 1 depicts a basic two inductor bi-directional DC-to-DC converter. In a boost mode, switches Q1 and Q2 operate as the main switching device to transfer power from Vlo to Vhi. In a buck mode, switches S1-S4 operate as the main switching device to transfer power from Vhi to Vlo.

It has been recognized that two-inductor boost converters suffer from limited output voltage regulation range when operated at low duty cycles. More particularly, when a load is below the minimum input power of a converter circuit of this type, further decreases in the load result in abnormal increases in output voltage due to excess energy storage in the inductors. Yan et al. have proposed a solution to avoid these increases in output voltage. ("Isolated Two-inductor Boost Converter with One Magnetic Core," Eighteenth Annual Applied Power Electronics Conference and Exposition, Feb. 9-13, 2003, Miami Beach, Fla., pp. 879-885.) An auxiliary transformer is utilized in series with two inductors to magnetically couple the two input current paths, ensuring that the current in the two inductors is the same. Thus, inductor current is eliminated when the load draws no current. A magnetic component disclosed by Yan et al. provides an isolated two-inductor boost converter with one transformer. This component has two inductor windings intrinsically coupled and is implemented with one gap in a three-leg magnetic core. However, circuits utilizing an auxiliary transformer and those utilizing the magnetic component of Yan et al. may require that these windings or components be capable of carrying high currents.

Another example of a DC-to-DC converter is disclosed by Li et al. ("A Natural ZVS High-power Bi-direction dc-to-dc Converter with Minimum Number of Devices," presented at IEEE Industry Applications Society Annual Meeting, Sep. 30-Oct. 4, 2001, Chicago, Ill., pp. 1874-1881.) This converter is operated with dual half-bridges placed on each side of an isolation transformer. When power flows from the low-voltage side to the high-voltage side, the circuit operates in boost mode. Conversely, when power flows in the opposite direction, the circuit works in buck mode to recharge a battery used to provide power to the low-voltage section. To support bidirectionality, a complex thirteen-step commutation procedure is used that depends upon the magnitudes of various currents at specified times.

FIG. 2 depicts the converter described in U.S. Ser. No. 10/881,213, assigned to the same assignee as the present application titled "DC Converter Circuit with Overshoot Protection." The additional capacitors C1 and C2 provide soft switching for S2 and S4 when S1-S4 are working as main switching device for the buck mode, and to provide overshoot protection for Q1 and Q2 when Q1 and Q2 are working as main switching device for the boost mode.

FIG. 3 shows a gate drive control waveform described in U.S. Patent Publication No. 2005/0024904A1 of Kajouke et al., U.S. Ser. No. 10/630,496, assigned to the same assignee as the present application. This publication describes a control method that in general can apply to any bi-directional converter including the converters shown in FIG. 1 and FIG. 2 to achieve no-load operation in either direction. When this method is applied to the circuit shown in FIG. 2, it provides the no-load operation in the buck mode (power flowing Vhi to Vlo). However when this method is applied to the boost mode (power flowing from Vlo to Vhi) the overshoot protection provided by C1 and C2 for Q1 and Q2 is destroyed by the switching action of S2 and S4 which is needed only for the no-load operation.

In the normal operation of the circuit shown in FIG. 2 operating in boost mode, switches Q1 and Q2 work as the main switching device, and switches S1-S4 work as rectifiers with the internal anti-parallel diodes. However, when operating in a no load condition, a minimum amount energy will have to flow from power source Vlo to Vhi because both Q1 and Q2 can not be turned off at the same time. This condition is needed to avoid abrupt changes in current flowing through inductors that can lead to destructive voltage spikes across the switches. If even a minimal amount of energy were to flow from power source Vlo to Vhi and there was no reverse energy sent back from Vhi to Vlo, the output voltage across capacitor C0 would continue to increase, and thus, could not be regulated. The method proposed by Kajouke et al., U.S. Ser. No. 10/630,496, uses switches S1-S4 to provide reverse energy flow to balance out minimal amount of energy flowing forward from power source Vlo to Vhi. However, the switching action of switches S2 and S4 will destroy the overshoot protection condition for switches Q1 and Q2.

What is needed is a circuit and method of operating the circuit that will provide voltage regulation at a no-load condition over a wide voltage range and also will provide overshoot protection for Q1 and Q2.

SUMMARY OF THE INVENTION

A circuit embodiment of the invention includes control circuitry and a converter. The converter is an isolated bi-directional dc/dc converter that includes a transformer having a primary and a secondary, boost mode main switching circuitry coupled to the primary of the transformer, buck mode main switching circuitry coupled to the secondary of the transformer and boost mode overshoot protection circuitry. The buck mode main switching circuitry includes a first switch coupled between a first lead of the secondary and a first terminal of a load, a second switch coupled between a second lead of the secondary and the first terminal of the load, a third switch coupled between the first lead of the secondary and a second terminal of the load, and a fourth switch coupled between the second lead of the secondary and the second terminal of the load. The control circuitry is coupled to the first, second, third and fourth switches and is operable to control the buck mode main switching circuitry to change from a base state to a first half cycle state during a first half cycle. The base state is where the first, second, third and fourth switches are all turned off. The first half cycle state is where the first switch is turned on and the second, third and fourth switches are all turned off. The control circuitry is further operable to control the buck mode main switching circuitry to change from the first half cycle state to the base state at an end of the first half cycle. The control circuitry is further operable to control the buck mode main switching circuitry to change from the base state to a second half cycle state during a second half cycle. The second half cycle state is where the third switch is turned on and the first, second and fourth switches are all turned off.

A method embodiment of the invention operates an isolated bi-directional dc/dc converter to provide voltage regulation at a no-load condition over a wide voltage range and also provide overshoot protection for the boost mode main switching transistors uses new boost mode drive waveforms. The new waveforms drive switches S2 and S4 to be turned off during boost mode and only S1 and S3 are switched to provide reverse energy flow at no-load. In boost mode, C1 and C2 provide overshoot protection caused by leakage inductance of the isolation transformer when boost mode drive transistors turn off during forward energy flow and provide stored energy for reverse energy flow during reverse energy flow periods used for voltage regulation in the boost mode. In buck mode, C1 and C2 provide soft switching for buck mode main switching transistors S2 and S4.

In association with an isolated bi-directional dc/dc converter that includes buck mode main switching circuitry that in turn includes first, second, third and fourth switches, a processor readable medium embodiment of the invention includes instruction sets operable with a processor for controlling the buck mode main switching circuitry to change from a base state to a first half cycle state during a first half cycle. The base state is where the first, second, third and fourth switches are in off states. The first half cycle state is where the first switch is in an on state and the second, third and fourth switches are all in off states. The embodiment further includes instruction sets operable with the processor for controlling the buck mode main switching circuitry to change from the first half cycle state to the base state at an end of the first half cycle. The embodiment further includes instruction sets operable with the processor for controlling the buck mode main switching circuitry to change from the base state to a second half cycle state during a second half cycle. The second half cycle state is where the third switch is in an on state and the first, second and fourth switches are all in off states.

BRIEF DESCRIPTION OF THE DRAWINGS

The invention will be described in detail in the following description of preferred embodiments with reference to the following figures.

DETAILED DESCRIPTION OF PREFERRED EMBODIMENTS

The following description of the preferred embodiment(s) is merely exemplary in nature and is in no way intended to limit the invention, its application, or uses.

Figure 1:
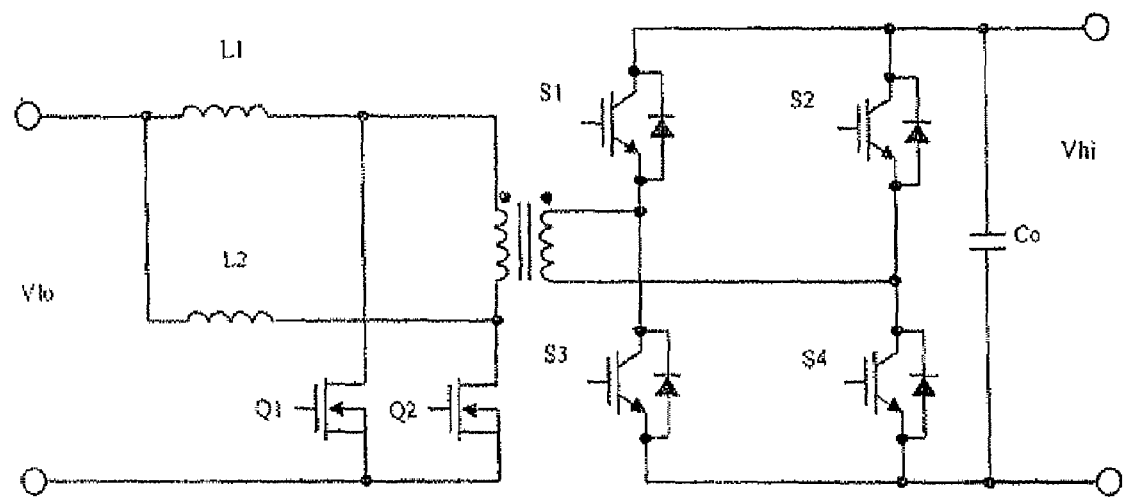
FIG. 1 is a schematic of a known isolated bi-directional dc/dc converter.
Figure 2:
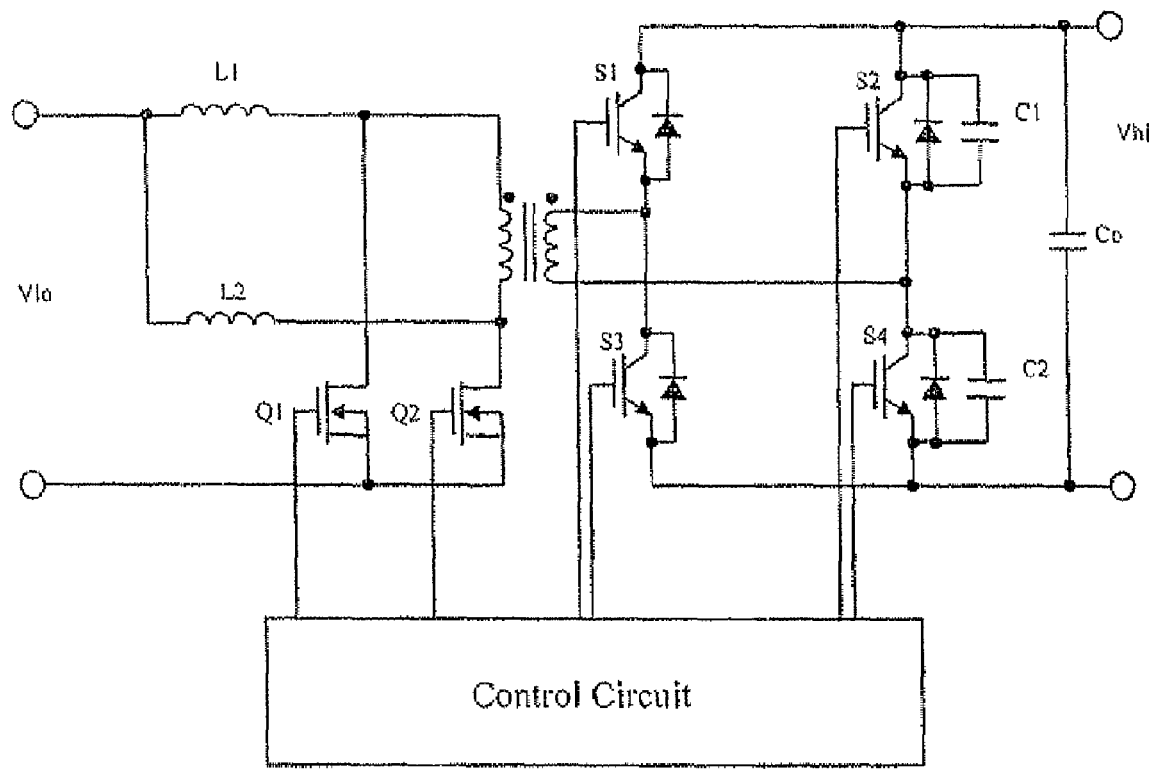
FIG. 2 is a schematic of the soft switching isolated bi-directional dc/dc converter with overshoot protection shown in U.S. patent application Ser. No. 10/881,213.
Figure 3:
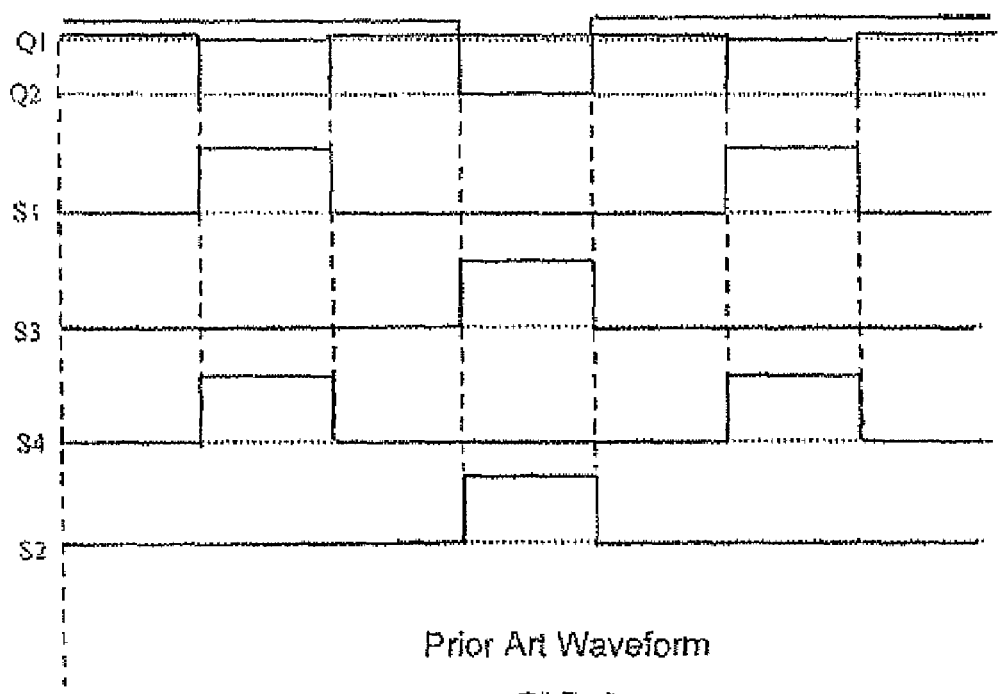
FIG. 3 is a waveform plot of a boost mode gate drive waveforms of isolated bi-directional dc/dc converter with light and no load shown in U.S. patent application Ser. No. 10/630,496.

Described herein is a method of operating the circuit of FIG. 2 that will provide voltage regulation at a no-load condition over a wide voltage range and also will provide overshoot protection for the boost mode main switching transistors, the input switching transistors in boost mode (e.g., Q1 and Q2). The method of operating uses only switches S1 and S3 (not switches S2 and S4) in boost mode to provide the reverse energy flow from the energy stored in C1 and C2 when the boost mode is operated under no load conditions. In boost mode, energy is transferred forward from Vlo to Vhi until the voltage charged up across C0 (i.e., series connected C1 and C2) exceeds the maximum regulated limit, and then reverse flow is begun to transfer energy in a reverse direction from Vhi to Vlo until the voltage charged up across C0 (i.e., series connected C1 and C2) drops below the minimum regulated limit. With the limited stored energy in C1 and C2, the circuit shown in FIG. 2 will provide voltage regulation of the voltage Vhi at no-load over a wide voltage range and also provide the overshoot protection for Q1 and Q2 at all operation conditions.

Therefore C1 and C2 will now have three functions. In a buck mode operation, where S1 and S4 are used as main switching devices to convert power from Vhi to Vlo, C1 and C2 provide soft switching for the switching devices S2 and S4. In a boost mode operation, where Q1 and Q2 are used as main switching devices to converter power from Vlo to Vhi, C1 and C2 provide overshoot protection due to the leakage inductance of the transformer when Q1 or Q2 turns off. The detailed operating principal of the boost mode is discussed in U.S. patent application Ser. No. 10/881,213, assigned to the same assignee as the present application titled "DC Converter Circuit with Overshoot Protection." In a boost mode light or no load operation, C1, C2, S1 and S3 form a half bridge circuit to provide a reverse energy flow which makes the voltage regulation possible.

Figure 4:
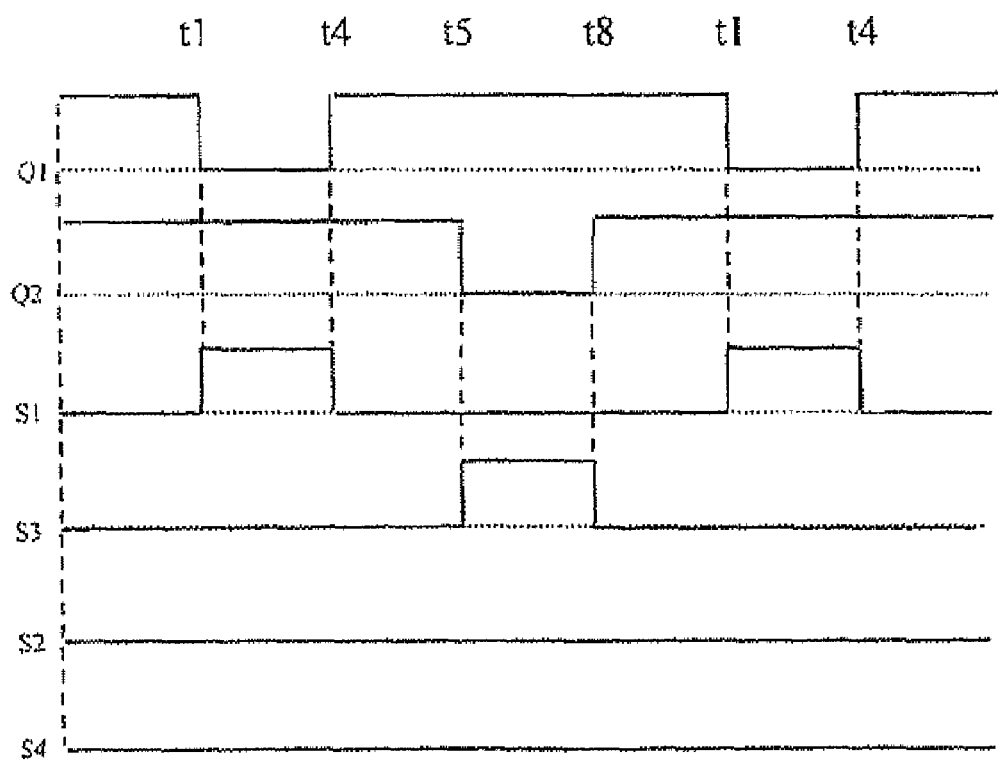
FIG. 4 is a waveform plot of a boost mode gate drive waveforms of isolated bi-directional dc/dc converter with overshoot protection even at light and no load that is an example of the present invention.

FIG. 4 depicts boost mode gate drive waveforms of isolated bi-directional dc/dc converter with overshoot protection even at light and no load. The operating principal of the boost mode reverse flow operation is as follows.

Figure 5:
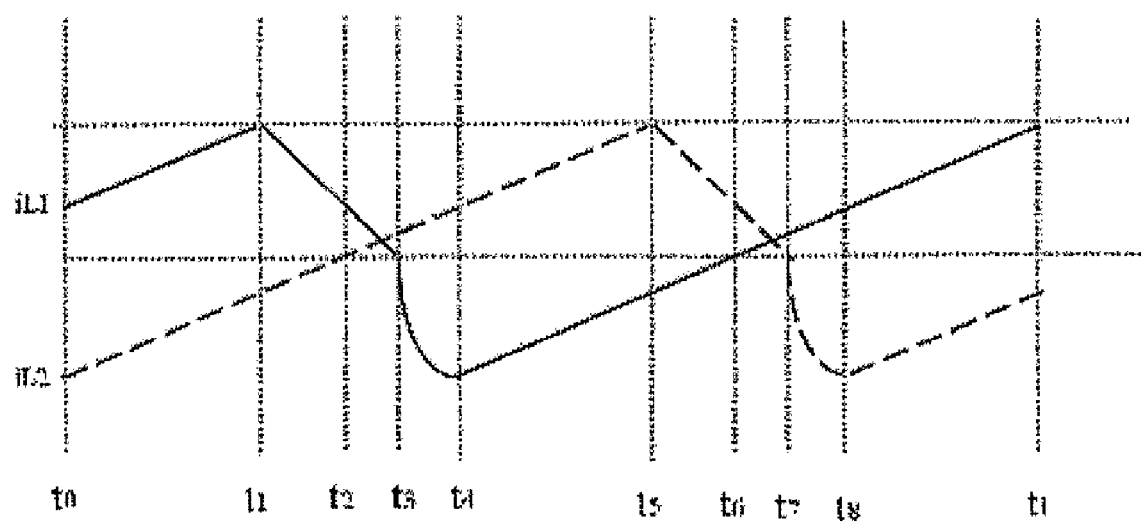
FIG. 5 is waveform plot of two inductor current waveform in boost mode at no-load as an example of the present invention.

FIG. 5 depicts a full cycle of one of the inductor current waveforms, the current through L1 of FIG. 2, in boost mode at light or no load. At time t0, Q1 and Q2 are turned on. The L1 inductor current rises linearly flowing through Q1. At time t1, Q1 is turned off, Q2 remains on, and S1 is turned on. The current from one side of the source of Vlo (e.g., the +side) passes through L1 into the dotted side of the primary of the isolation transformer, out of the non-dotted side of the primary of the isolation transformer, through Q2 and back to the other side of the source of Vlo (e.g., the −side). When Q1 is turned off, current previously flowing through L1 continues to flow through L1 but must suddenly flow through the primary of the isolation transformer, through Q2 and back to the other side of the source of Vlo. This sudden change in current applies most of the voltage of Vlo across the primary of the isolation transformer, and in fact, due to leakage inductance in the isolation transformer, a voltage overshoot on Q1 occurs. The voltage overshoot on Q1 due to the leakage inductance of the isolation transformer is reduced by C1 and C2 as described in detail in U.S. patent application Ser. No. 10/881,213, assigned to the same assignee as the present application, and titled "DC Converter Circuit with Overshoot Protection."

The L1 inductor current, now flowing into the dotted side of the primary of the isolation transformer, induces a secondary current out of the dotted side of the secondary of the isolation transformer. This transfers energy from Vlo to Vhi, and as energy is transferred, the current through L1 diminishes between times t1 and t2. Some of this current induced in the secondary of the isolation transformer charges C1 by flowing in a circuit out of the dotted side of the secondary of the isolation transformer through the anti-parallel diode of switch S1, through C1 and back into the non-dotted side of the secondary of the isolation transformer. Also, some of this current discharges C2 by flowing in a circuit out of the dotted side of the secondary of the isolation transformer through the anti-parallel diode of switch S1, through C0, through C2 (in a direction reverse from a charging direction) and back into the non-dotted side of the secondary of the isolation transformer.

When C2 becomes discharged, the diode in switch S4 causes current to bypass C2 and flow through the anti-parallel diode of S4. Thus, C2 discharges, but does not begin to charge in a negative direction. After C1 is fully charged and C2 is fully discharged, the anti-parallel diodes of S1 and S4 are both forward biased.

The energy stored in L1 is now transferring to Vhi (and accumulating on C0). Some of the current out of the dotted side of the secondary of the isolation transformer flows in a circuit through the anti-parallel diode of switch S1, through C0, through the anti-parallel diode of S4 and back into the non-dotted side of the secondary of the isolation transformer. And, some of the current out of the dotted side of the secondary of the isolation transformer flows in a circuit through the anti-parallel diode of switch S1, through C1 and back into the non-dotted side of the secondary of the isolation transformer. In an example of the invention, the capacity of C0 is significantly greater than the capacity of C1 so that most of the transferred energy not used in the load is absorbed in C0. C1 and C2 serve to provide a soft switching function for switching of transistors Q1 and Q2.

As capacitor C0 becomes charged, the current through L1 diminishes. In boost mode, energy continues to flow from Vlo to Vhi until, at time t3, the L1 current reaches zero and stops the energy transfer to Vhi (see FIG. 5).

At time t3, the voltage across the secondary of the isolation transformer has diminished to less than the voltage on C1. Because switch S1 is turned on, some current begins to flow in reverse in a circuit from C1, through S1, into the dotted side of the secondary of the isolation transformer, and then out of the non-dotted side of the secondary of the isolation transformer and back into C1. And, some current flows in reverse in a circuit from C0, through S1, into the dotted side of the secondary of the isolation transformer, and then out of the non-dotted side of the secondary of the isolation transformer, through C2 and back into C0. This reverse current flow causes the current flow in L1 to reverse and become negative (see FIG. 5), thus transferring energy into source Vlo.

Between times t3 and t4, energy reverses the flow direction discharging C1 (and C0) and charging C2. Since S1 is already turned on at time t1 and remains turned on between times t3 and t4, the energy stored in C1 flows out of C1, through switch S1, into the dotted side of the secondary of the isolation transformer, out of the non-dotted side of the secondary of the isolation transformer and back to C1. As C1 looses energy and the voltage across C1 discharges, some current out of the non-dotted side of the secondary of the isolation transformer begins to pass through C2 (in a direction charging C2), through C0, through switch S1 and back into the dotted side of the secondary of the isolation transformer to complete the circuit and charge C2 so that the voltages across C1 and C2 sum to the voltage across C0. This current flow discharges C1 and charges C2. This causes energy to flow in a boost mode in a reverse direction across the isolation transformer, flowing current into inductor L1 and transferring energy from Vhi to Vlo.

Between times t3 and t4, current flowing into the dotted side of the secondary of the isolation transformer induces current flowing out of the dotted side of the primary of the isolation transformer, an induced current that must flow through L1 and generates a negative current flow until C1 is discharged (see FIG. 5).

At time t4, Q1 is again turned on, Q2 remains on, and S1 is again turned off (see FIG. 4). The negative current flowing through L1 during a reverse energy flow in the boost mode begins to diminish, but continues until at time t6, the L1 inductor current reaches zero (see FIG. 5).

After time t6, the L1 inductor current reverses direction and continues to rise linearly until time t1 (see FIG. 5) and the next cycle begins. The cycle for the L2 inductor current is analogous to the L1 inductor current with Q1 and Q2 interchanged, S1 and S3 interchanged, S2 and S4 interchanged and C1 and C2 interchanged. C0, Vhi and Vlo continue to play the same roles, but the dotted sides and non-dotted sides are interchanged in each of the primary and secondary of the isolation transformer.

For example, at time t5, Q2 is turned off, Q1 remains on, and S3 is turned on. Beginning with Q2 being turned off, current from one side of the source of Vlo (e.g., the +side) passes through L2 into the non-dotted side of the primary of the isolation transformer, out of the dotted side of the primary of the isolation transformer, through Q1 and back to the other side of the source of Vlo (e.g., the −side). The voltage overshoot on Q2 due to the leakage inductance of the isolation transformer is reduced by C1 and C2.

The L2 inductor current, now flowing into the non-dotted side of the primary of the isolation transformer, induces a secondary current out of the non-dotted side of the secondary of the isolation transformer. This transfers energy from Vlo to Vhi, and as energy is transferred, the current through L2 diminishes between times t5 and t7. Some of this current induced in the secondary of the isolation transformer charges C2 by flowing in a circuit out of the non-dotted side of the secondary of the isolation transformer through C2, through the anti-parallel diode of switch S3, and back into the dotted side of the secondary of the isolation transformer. Also, some of this current discharges C1 by flowing in a circuit out of the non-dotted side of the secondary of the isolation transformer through C1 (in a direction reverse from a charging direction), through C0, through the anti-parallel diode of switch S3, and back into the dotted side of the secondary of the isolation transformer.

When C1 is discharged, current will bypass C1 and flow through the anti-parallel diode of S2. After C2 is fully charged and C1 is fully discharged, the anti-parallel diodes of S2 and S3 are forward biased. The energy stored in L1 is now transferring to Vhi (and accumulating on C0). The current out of the non-dotted side of the secondary of the isolation transformer flows in a circuit through the anti-parallel diode of switch S2, through C0, through the anti-parallel diode of S3 and back into the dotted side of the secondary of the isolation transformer. In boost mode, energy continues to flow from Vlo to Vhi until, at time t7, the L2 current reaches zero and stops the energy transfer to Vhi (see FIG. 5 dashed line waveform for L2 inductor current).

Between times t7 and t8, energy reverses the flow direction discharging C2 and charging C1. Since S3 is already turned on at time t5 and remains turned on between times t7 and t8, the energy stored in C2 flows out of C2 into the non-dotted side of the secondary of the isolation transformer, out of the dotted side of the secondary of the isolation transformer, through switch S3 and back to C2. As C2 looses energy and the voltage across C2 discharges, some current out of the dotted side of the secondary of the isolation transformer begins to pass through switch S3, through 0, through C1 (in a direction charging C1) and back into the non-dotted side of the secondary of the isolation transformer to complete the circuit and charge C1 so that the voltages across C1 and C2 sum to the voltage across C0. This current flow discharges C2 and charges C1. This causes energy to flow in a boost mode in a reverse direction across the isolation transformer, flowing current into inductor L2 and transferring energy from Vhi to Vlo.

Between times t7 and t8, current flowing into the non-dotted side of the secondary of the isolation transformer induces current flowing out of the non-dotted side of the primary of the isolation transformer, an induced current that must flow through L2 to generate a negative current flow until C2 is discharged (see FIG. 5 dashed line waveform for L2 inductor current).

At time t8, Q2 is again turned on, Q1 remains on, and S3 is again turned off (see FIG. 4). The energy stored in L2 by reason of the negative current flowing through L2 during a reverse energy flow in the boost mode begins to diminish, and the negative current that delivers energy stored in L2 to source Vlo continues until time t1 of the next cycle.

In an embodiment of circuit that includes control circuitry and a converter, the converter is an isolated bi-directional dc/dc converter that includes a transformer having a primary and a secondary, boost mode main switching circuitry coupled to the primary of the transformer, buck mode main switching circuitry coupled to the secondary of the transformer and boost mode overshoot protection circuitry (capacitors C1 and C2). The buck mode main switching circuitry includes a first switch S1 coupled between a first lead of the secondary (the dotted side of the secondary of the isolation transformer) and a first terminal of a load (Vhi). The buck mode main switching circuitry further includes a second switch S2 coupled between a second lead of the secondary (the non-dotted side of the secondary of the isolation transformer) and the first terminal of the load. The buck mode main switching circuitry further includes a third switch S3 coupled between the first lead of the secondary and a second terminal of the load. The buck mode main switching circuitry further includes a fourth switch S4 coupled between the second lead of the secondary and the second terminal of the load.

The control circuitry (labeled "control circuit" in FIG. 2) is coupled to the first, second, third and fourth switches S1, S2, S3, S4. The control circuitry is operable to control the buck mode main switching circuitry to change from a base state to a first half cycle state during a first half cycle (at t1 in FIGS. 4 and 5). The base state is where the first, second, third and fourth switches are all turned off. The first half cycle state is where the first switch S1 is turned on and the second, third and fourth switches S2, S3, S4 are all turned off.

The control circuitry is also operable to control the buck mode main switching circuitry to change from the first half cycle state to the base state at an end of the first half cycle (at t4 in FIGS. 4 and 5). The control circuitry is still further operable to control the buck mode main switching circuitry to change from the base state to a second half cycle state during a second half cycle (at t5 in FIGS. 4-6). The second half cycle state is where the third switch S3 is turned on and the first, second and fourth switches S1, S2, S4 are all turned off.

Frequently, the control circuitry is made from a microprocessor and a memory, but it need not be made that way. It may be made from discrete components, application specific integrated circuits (ASICs), field programmable gate arrays (FPGAs), or any equivalent. When made from a microprocessor (or other processor), the control circuitry shares the processor with other functions frequently assigned to such a processor.

Having described preferred embodiments of a novel bi-directional no load control with overshoot protection (which are intended to be illustrative and not limiting), it is noted that modifications and variations can be made by persons skilled in the art in light of the above teachings. It is therefore to be understood that changes may be made in the particular embodiments of the invention disclosed which are within the scope of the invention as defined by the appended claims.

Having thus described the invention with the details and particularity required by the patent laws, what is claimed and desired protected by Letters Patent is set forth in the appended claims.

What is claimed is:

1. A circuit comprising control circuitry and a converter, wherein:

the converter is an isolated bi-directional dc/dc converter that includes a transformer having a primary and a secondary, boost mode main switching circuitry coupled to the primary of the transformer, buck mode main switching circuitry coupled to the secondary of the transformer and boost mode overshoot protection circuitry;

the buck mode main switching circuitry includes a first switch coupled between a first lead of the secondary and a first terminal of a load, a second switch coupled between a second lead of the secondary and the first terminal of the load, a third switch coupled between the first lead of the secondary and a second terminal of the load, and a fourth switch coupled between the second lead of the secondary and the second terminal of the load;

the control circuitry is coupled to the first, second, third and fourth switches and is operable to control the buck mode main switching circuitry to change from a base state to a first half cycle state during a first half cycle, the base state being where the first, second, third and fourth switches are all turned off, the first half cycle state being where the first switch is turned on and the second, third and fourth switches are all turned off;

the control circuitry is further operable to control the buck mode main switching circuitry to change from the first half cycle state to the base state at an end of the first half cycle; and the control circuitry is further operable to control the buck mode main switching circuitry to change from the base state to a second half cycle state during a second half cycle, the second half cycle state being where the third switch is turned on and the first, second and fourth switches are all turned off.

2. A circuit according to claim 1, wherein the control circuitry is further operable to control the buck mode main switching circuitry to change from the second half cycle state to the base state at an end of the second half cycle.

3. A circuit according to claim 2, wherein the control circuitry is further operable to repeatedly control the buck mode main switching circuitry to repeatedly cycle between the first and second half cycles.

4. A circuit according to claim 1, wherein the boost mode overshoot protection circuitry includes:

a first capacitor coupled across the second switch; and
a second capacitor coupled across the fourth switch.

5. A circuit according to claim 1, wherein:

the boost mode main switching circuitry includes a first boost mode switch and a second boost mode switch;
the control circuitry is further operable to control the boost mode main switching circuitry to cause the first boost mode switch to be maintained off while the first switch is maintained on and to cause the first boost mode switch to be maintained on at all other times; and the control circuitry is further operable to control the boost mode main switching circuitry to cause the second boost mode switch to be maintained off while the third switch is maintained on and to cause the second boost mode switch to be maintained on at all other times.

6. A method of controlling an isolated bi-directional dc/dc converter that includes buck mode main switching circuitry that in turn includes first, second, third and fourth switches, the method comprising:

controlling the buck mode main switching circuitry to change from a base state to a first half cycle state during a first half cycle, the base state being where the first, second, third and fourth switches are in off states, the first half cycle state being where the first switch is in an on state and the second, third and fourth switches are all in off states;

controlling the buck mode main switching circuitry to change from the first half cycle state to the base state at an end of the first half cycle; and controlling the buck mode main switching circuitry to change from the base state to a second half cycle state during a second half cycle, the second half cycle state being where the third switch is in an on state and the first, second and fourth switches are all in off states, wherein:

the converter further includes a transformer having a primary and a secondary, boost mode main switching circuitry coupled to the primary of the transformer, boost mode overshoot protection circuitry, wherein the buck mode main switching circuitry is coupled to the secondary of the transformer; and the buck mode main switching circuitry is configured so the first switch is coupled between a first lead of the secondary and a first terminal of a load, the second switch is coupled between a second lead of the secondary and the first terminal of the load, the third switch is coupled between the first lead of the secondary and a second terminal of the load, and the fourth switch is coupled between the second lead of the secondary and the second terminal of the load.

7. A method according to claim 6, wherein the buck mode switching circuitry further includes boost mode overshoot protection circuitry that includes a first capacitor coupled across the second switch and a second capacitor coupled across the fourth switch.

8. A method according to claim 6, further comprising the buck mode main switching circuitry to change from the second half cycle state to the base state at an end of the second half cycle.

9. A method according to claim 8, further comprising controlling the buck mode main switching circuitry to alternate between the first and second half cycles.

10. A method according to claim 6, wherein:

the isolated bi-directional dc/dc converter further includes a boost mode main switching circuitry that includes first and second boost mode switches;

the method further comprising controlling the first boost mode switch to be maintained in an off state while the first switch is maintained in an on state and to be maintained in an on state at all other times; and the method further comprising controlling the second boost mode switch to be maintained in an off state while the third switch is maintained in an on state and to be maintained in an on state at all other times.

11. In association with an isolated bi-directional dc/dc converter that includes buck mode main switching circuitry that in turn includes first, second, third and fourth switches, a processor readable medium that includes instruction sets operable with a processor for controlling the buck mode main switching circuitry to change:

from a base state to a first half cycle state during a first half cycle, the base state being where the first, second, third and fourth switches are in off states, the first half cycle state being where the first switch is in an on state and the second, third and fourth switches are all in off states;

from the first half cycle state to the base state at an end of the first half cycle; and from the base state to a second half cycle state during a second half cycle, the second half cycle state being where the third switch is in an on state and the first, second and fourth switches are all in off states, wherein:

the converter further includes a transformer having a primary and a secondary, boost mode main switching circuitry coupled to the primary of the transformer, boost mode overshoot protection circuitry, wherein the buck mode main switching circuitry is coupled to the secondary of the transformer; and the buck mode main switching circuitry is configured so the first switch is coupled between a first lead of the secondary and a first terminal of a load, the second switch is coupled between a second lead of the secondary and the first terminal of the load, the third switch is coupled between the first lead of the secondary and a second terminal of the load, and the fourth switch is coupled between the second lead of the secondary and the second terminal of the load.

12. A medium according to claim 11, that includes a further instruction set operable with the processor for controlling the buck mode main switching circuitry to change from the second half cycle state to the base state at an end of the second half cycle.

13. A medium according to claim 12, that includes a further instruction set operable with the processor for controlling the buck mode main switching circuitry to alternate between the first and second half cycles.

14. A medium according to claim 11, wherein:

the isolated bi-directional dc/dc converter further includes a boost mode main switching circuitry that includes first and second boost mode switches;

the medium includes a further instruction set operable with the processor for controlling the first boost mode switch to be maintained in an off state while the first switch is maintained in an on state and to be maintained in an on state at all other times; and the medium includes a further instruction set operable with the processor for controlling the second boost mode switch to be maintained in an off state while the third switch is maintained in an on state and to be maintained in an on state at all other times.

* * * * *